March 2, 1971     K. F. RUSSELL     3,566,579

APPARATUS AND METHOD FOR PACKAGING CITRUS FRUIT

Filed Nov. 18, 1968     6 Sheets-Sheet 1

INVENTOR.
KENNETH F. RUSSELL
DECEASED

By
Miketta, Glenny, Poms & Smith

ATTORNEYS.

March 2, 1971 K. F. RUSSELL 3,566,579
APPARATUS AND METHOD FOR PACKAGING CITRUS FRUIT
Filed Nov. 18, 1968 6 Sheets-Sheet 2

INVENTOR.
KENNETH F. RUSSELL
DECEASED
By
Miketta, Glenny, Poms & Smith
ATTORNEYS.

March 2, 1971  K. F. RUSSELL  3,566,579
APPARATUS AND METHOD FOR PACKAGING CITRUS FRUIT
Filed Nov. 18, 1968  6 Sheets-Sheet 4

INVENTOR.
KENNETH F. RUSSELL
DECEASED
By
Miketta, Glenny, Poms & Smith
ATTORNEYS.

United States Patent Office 3,566,579
Patented Mar. 2, 1971

3,566,579
APPARATUS AND METHOD FOR PACKAGING
CITRUS FRUIT
Kenneth F. Russell, deceased, late of Claremont, Calif., by Marie D. Russell, Claremont, Thomas L. Russell, San Rafael, and Douglas O. Russell, Los Angeles, Calif., heirs, assignors to Brogdex Company, Pomona, Calif.
Filed Nov. 18, 1968, Ser. No. 779,300
Int. Cl. B65b 1/22, 25/04, 43/54
U.S. Cl. 53—24                                    16 Claims

ABSTRACT OF THE DISCLOSURE

A vibrating means having a station at which a box loosely and randomly containing a preselected number of fruit is positioned and firmly held while the box is subjected to vertical vibrations for a selected period of time. The vibratory apparatus includes a descending platen which moves into covering relation with the open top of the box to confine fruit in the box and to superimpose a descending planar surface, which is vibrating with the same amplitude, frequency and phase as the box, into close proximity with the fruit so as to facilitate movement of the preselected number of fruit into a desirable tightly packed pattern or arrangement.

BACKGROUND OF THE INVENTION

Citrus fruit or other articles which are crushable have heretofore been hand-packed in boxes or containers of selected size. Since fruit are graded as to size and the volumetric size of the box has been standardized, fruit has heretofore been hand-packed in such boxes in accordance with predetermined and selected patterns for each layer so that a selected number of fruit of a particular size would be contained within a box. During hand-packing of the fruit a certain hand pressure may be applied to different fruit in order to accomplish a desired pattern of fruit in a horizontal layer. As a result hand-packed fruit were firmly packed and the volume of the box occupied by the fruit would be approximately sixty to sixty-five percent of the volume of the box. It is desirable that a firm pack be provided in order to prevent relative movement between the fruit in the box during shipment, which relative movement might cause abrasion to the surfaces of the fruit and possible crushing and damage thereto. While a firm pack is desirable the fruit cannot be under too great a pressure which might cause a fruit to split and discharge its fluid contents throughout the box.

Machine packing of fruit has been attempted. In some instances a box is filled with fruit and then subjected to vibrations varying in frequency and amplitude in order to attempt to settle the fruit into the space or volume of the box. Such prior application of vibratory impulses generally to a box usually did not enhance settling of the fruit into a uniform arrangement whereby a precise number of sized fruit were contained in each box. Other proposed vibratory devices for packaging fruit included placing a layer of fruit in the box, vibrating that layer until a selected arrangement was achieved, then introducing a second layer of fruit into the box and vibrating the second layer until that layer achieved a desired pattern and then performing the same vibrating cycle with additional layers superimposed over the first layers. Such prior proposed vibrating method was satisfactory but was relatively slow. The objective of having each box containing a preselected number of fruit was often not achieved because of the variations in the pattern of the fruit in the box. Moreover, such prior proposed vibrating devices did not necessarily provide a firm pack capable of withstanding handling during shipment and storage.

The present invention contemplates a novel apparatus and method for packaging articles such as citrus fruit whereby a firm pack or a precise number of fruit in a pattern or arrangement approximating that of a hand-packed box or carton is achieved. The present invention contemplates receiving a box having a precise number of fruit therein, the box having been filled by an apparatus such as that described in my co-pending application, Ser. No. 653,239. Such a box with loosely filled fruit therein is then subjected to vertical vibrations of selected frequency and amplitude in order to settle and arrange the fruit in the box into a pattern or arrangement whereby approximately sixty to sixty-five percent of the volume of the box is filled by the fruit. The box is held during vibration and upward movement of the top layer of fruit (because of the vertical vibrations imparted thereto) is permitted under a condition of limited suppression whereby the fruit cannot jump out of the box and yet at the same time they are permitted sufficiently free movement so that virtually each fruit can be located in a pattern or arrangement which generally approximates that of a hand-packed box. This result is accomplished by providing a platen which moves downwardly toward the top layer of fruit and which is subjected to the same frequency of vibration, amplitude and phase as that to which the box is subjected. The rate of descent of the platen is varied from a relatively fast rate at the beginning to a slow rate as the platen moves into proximity with the top layer of the fruit and finally during the last second of the vibration cycle the platen may lightly press against the top layer of the fruit and hold the fruit in final location until the vibratory cycle stops. The packaged fruit are thus placed under a slight final pressure which generally approximates the pressure of a hand-packed box.

The primary object of the present invention therefore is to disclose and provide a novel vibratory apparatus for packaging citrus fruit, crushable articles, or the like.

Another object of the invention is to disclose and provide a novel vibratory apparatus for packaging articles in a container of selected volume whereby the articles will achieve a pattern or arrangement which will most effectively occupy the space of the box.

Another object of the invention is to disclose and provide a vibratory apparatus for packaging loose discrete articles in a container wherein a platen approaches the top opening of the container and is subjected to the same vibratory characteristics as the container so as to avoid damage or bruising of the articles in the container.

A further object of the invention is to disclose and provide a method and apparatus for packaging citrus fruit wherein boxes may be rapidly filled with fruit and the fruit may be rapidly arranged in the box by imparting vertical vibrations thereto for a relatively short vibratory cycle.

A still further object of the present invention is to disclose an apparatus and method of packaging fruit wherein a loosely packed receptacle is positioned at a vibratory station and subjected to vertical vibrations by a support table and with a superposed platen at the station, the table and platen being vibrated at the same frequency and amplitude and in phase, the platen being movable independently of and which maintaining the vertical vibrations.

Various other objects and advantages of the present invention will be readily apparent from the following description of the drawings in which an exemplary embodiment of the invention is shown.

Figure 1:
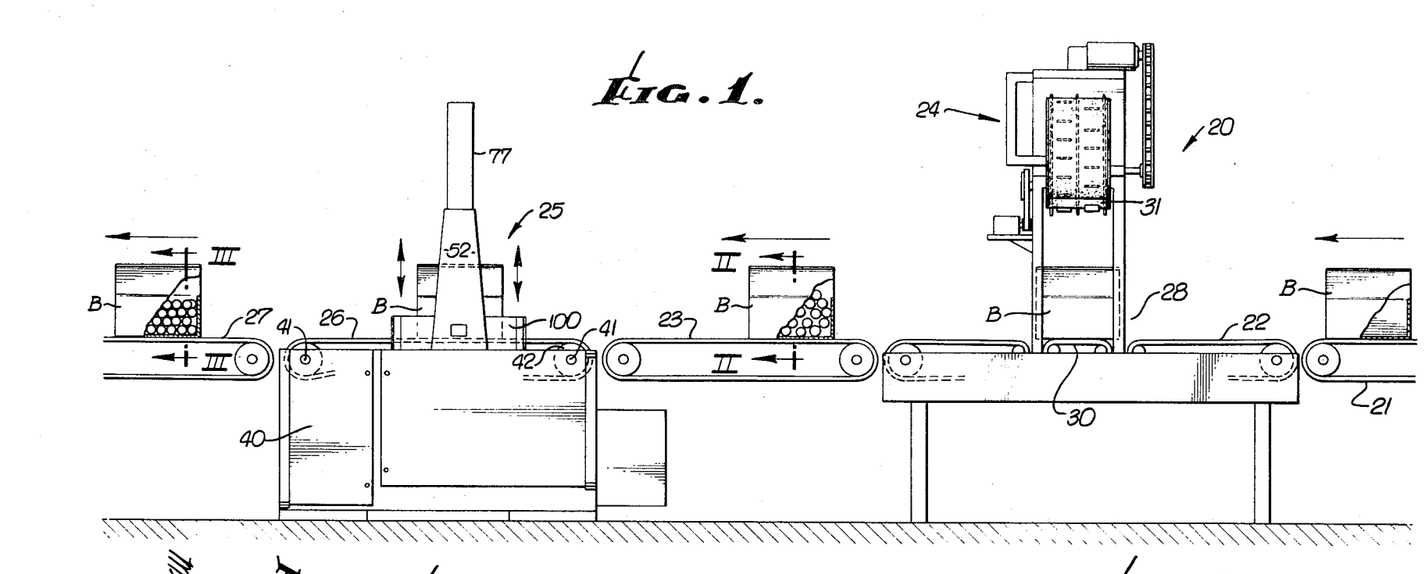
FIG. 1 is a side elevational view of a packaging method for discrete articles embodying this invention.
Figure 2:
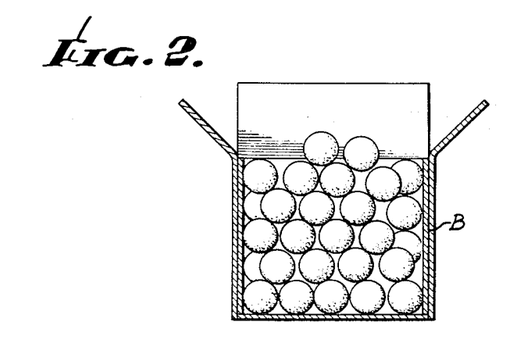
FIG. 2 is an enlarged vertical transverse sectional view of a loosely packed receptacle taken in the plane indicated by line II—II of FIG. 1.
Figure 3:
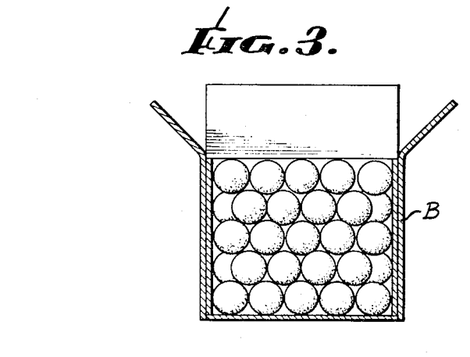
FIG. 3 is an enlarged sectional view taken in the plane indicated by line III—III of FIG. 1 and showing a desired packed condition of a receptacle.
Figure 4:
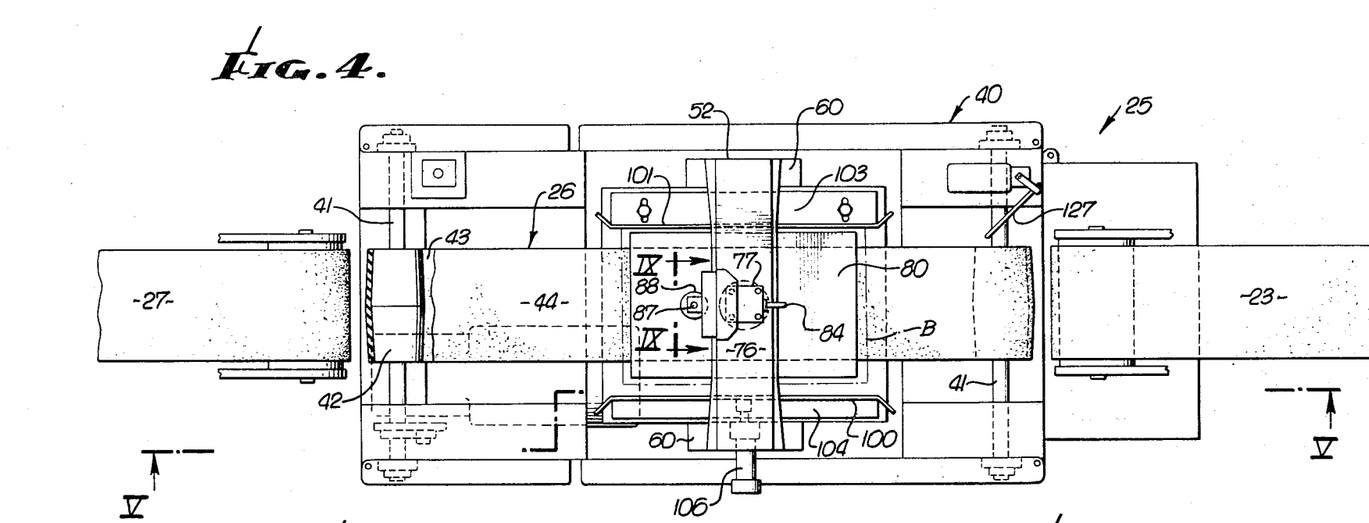
FIG. 4 is a top plan view of a vibratory apparatus embodying this invention.

In FIG. 1 a filling and packaging system and apparatus embodying this invention is schematically illustrated whereby discrete articles of similar size and shape, such as pre-sized citrus fruit, may be packaged in a receptacle such as a cardboard carton or box. Generally speaking, such a packaging system which exemplarily practices the method of this invention may comprise a box filling and packaging means generally indicated at 20, a conveyor system for transporting boxes B and comprising an empty box feed conveyor section 21, a filling conveyor section 22, a transfer conveyor section 23 for transferring filled boxes B from a fruit counting and filling means 24 to a vibrating apparatus 25 having a conveyor section 26 which may then transfer boxes with packaged fruit or articles to a discharge or transport conveyor 27. The box filling and counting means 24 has a box filling station 25 at which a box B may be filled with a predetermined number of articles or fruit of selected size in a partially packaged condition as shown in FIG. 2 wherein fruit are generally disposed in the box in random non-uniform arrangement and pattern. When a box having fruit in the partially packaged condition as shown in FIG. 2 is vibrated and treated by the vibrator apparatus means 25, the fruit in the box is packed and moved into a uniform pattern and arrangement of a type generally illustrated in FIG. 3. Since box B has a preselected volume, different sizes of fruit or articles will adopt slightly different patterns and arrangements when a predetermined number of fruit are fed to the box for packaging.

Box filling and counting means 24 is shown and described in my Letters Pat. No. 3,492,779 issued Feb. 3, 1970 and entitled "Apparatus and Method for Filling Boxes with a Preselected Quantity of Discrete Articles." Generally speaking such filling and counting means 24 is fed empty boxes B from feed conveyor section 21 and section 22 to a station conveyor portion 30 at which box B is stopped, raised upwardly to partially receive the lower end of elevator 31 which receives sized fruit from a delivery conveyor (not shown), and lowers each fruit individually by a plurality of longitudinally offset pockets into the lower portion of box B. Each fruit is counted as it is lowered into the box and at predetermined counts box B is incrementally lowered a preselected distance to permit the feeding of additional counted fruit on top of the layers of fruit already provided in the box. Such feeding of the box continues until the preselected final count is reached. The box is then lowered to the conveyor portion 30 and is moved away from the filling station by conveyor 22. The number of fruit counted for a box depends upon the size of the fruit being packaged. Since the size of such boxes are standardized the number of fruit may vary from 88 to about 216 for particular sizing classifications specified by the citrus fruit industry.

During filling of box B at means 24 box B is subjected to vibratory forces imparted to it during incremental lowering of the box during the filling operation. The initial vibratory forces imparted to the box B at the first incremental lowering step settle the fruit in the box into a bottom layer having a desired pattern. It has been found that such a bottom layer of fruit fed by means 24 will assume a pattern of approximately the same uniformity as if the bottom layer had been hand packed. Such first bottom layer pattern formation is important with respect to the facility of the remaining fruit to adopt or assume a selected pattern, and also because the box is turned upside down from its position at station 25 for display and/or inspection of the fruit packaged in the box. Establishment of such pattern uniformity on this layer facilitates the packaging operation as well as enhancing sales appearance of the fruit.

As mentioned above a box B filled with fruit from filling means 24 will be transported on transfer conveyor section 23 in a condition as shown in FIG. 2 and will approach the vibratory means 25 with the fruit in nonuniform random arrangement in the box except for the bottom-most layer.

Vibratory apparatus 25 may generally comprise a suitable base frame means 40 of suitably arranged frame members and plates for supporting transversely arranged shafts 41 at opposite ends thereof for carrying end rollers 42 for supporting and driving conveyor means 26 which includes an endless conveyor belt 43 having a top lay 44 defining a horizontal path of travel for box B through the vibratory station. Conveyor belt 43 may be suitably tensioned by an idle roller 45. One of shafts 41 may be driven by a pulley belt 46 connected to a pulley 47 on a motor shaft 48 driven by a motor means 49 supported on frame means 40.

Figure 10:
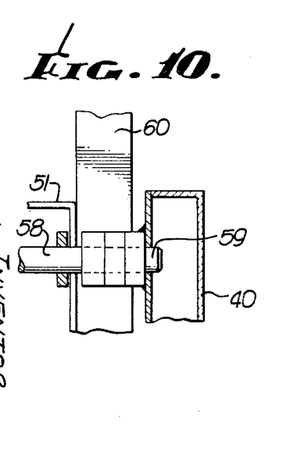
FIG. 10 is an enlarged fragmentary sectional view taken in a transverse vertical plane indicated by line X—X of FIG. 5.
Figure 11:
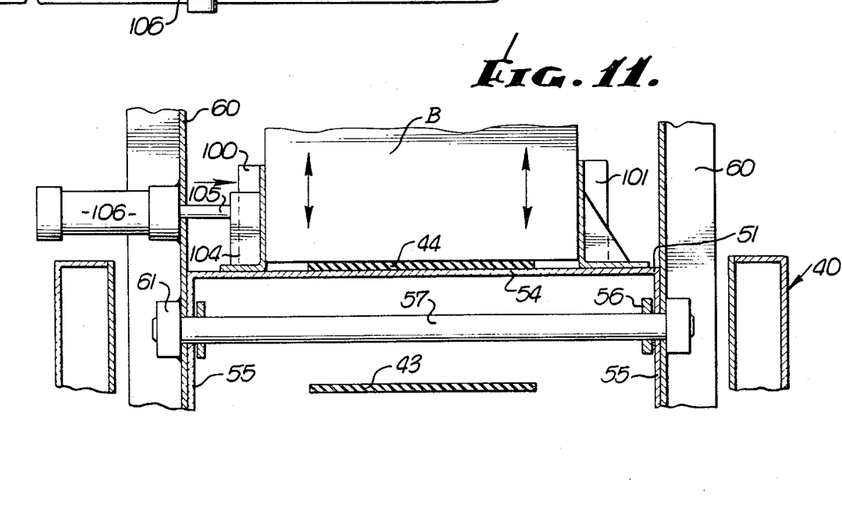
FIG. 11 is an enlarged fragmentary sectional view taken in the plane indicated by line XI—XI of FIG. 5.

Vibratory apparatus 25 also generally includes a box support table means 51 and an upstanding open bridge-like frame means 52 which are vibratable as a unit. Box support table 51 may comprise a top plate 54 upon which a top lay 44 of conveyor belt 43 may be supported. Plate 54 may be integrally connected with parallel depending side plates 55 of generally triangular form. Support table 51 may be supported from vibratory frame means 40 by generally horizontally extending top and bottom sets of parallel arms 56. Both sets of parallel arms may be of similar construction, the top and bottom set of arms 56 being pivotally connected to side plates 55 by transversely extending shafts 57. The opposite ends of each set of arms 56 may be pivotally connected by shafts 58 which are pivotally supported at 59 in frame means 40 (FIG. 10). Vertical movement of support plate 51 is virtually linear within the adjustable limits of eccentric throw of an eccentric means hereafter described and which imparts vibrations to the table.

Upstanding bridge-like frame means 52 may comprise a pair of parallel side columns 60 of suitable channel section and which are pivotally connected through bearing means 61 at each end of shaft 57 to the support table side plates 55. At their bottom ends side columns 60 are connected by a transversely extending shaft 62 which may carry intermediate its ends a pivotally and antifrictionally mounted crank arm 63.

Figures 5, 6, 7:
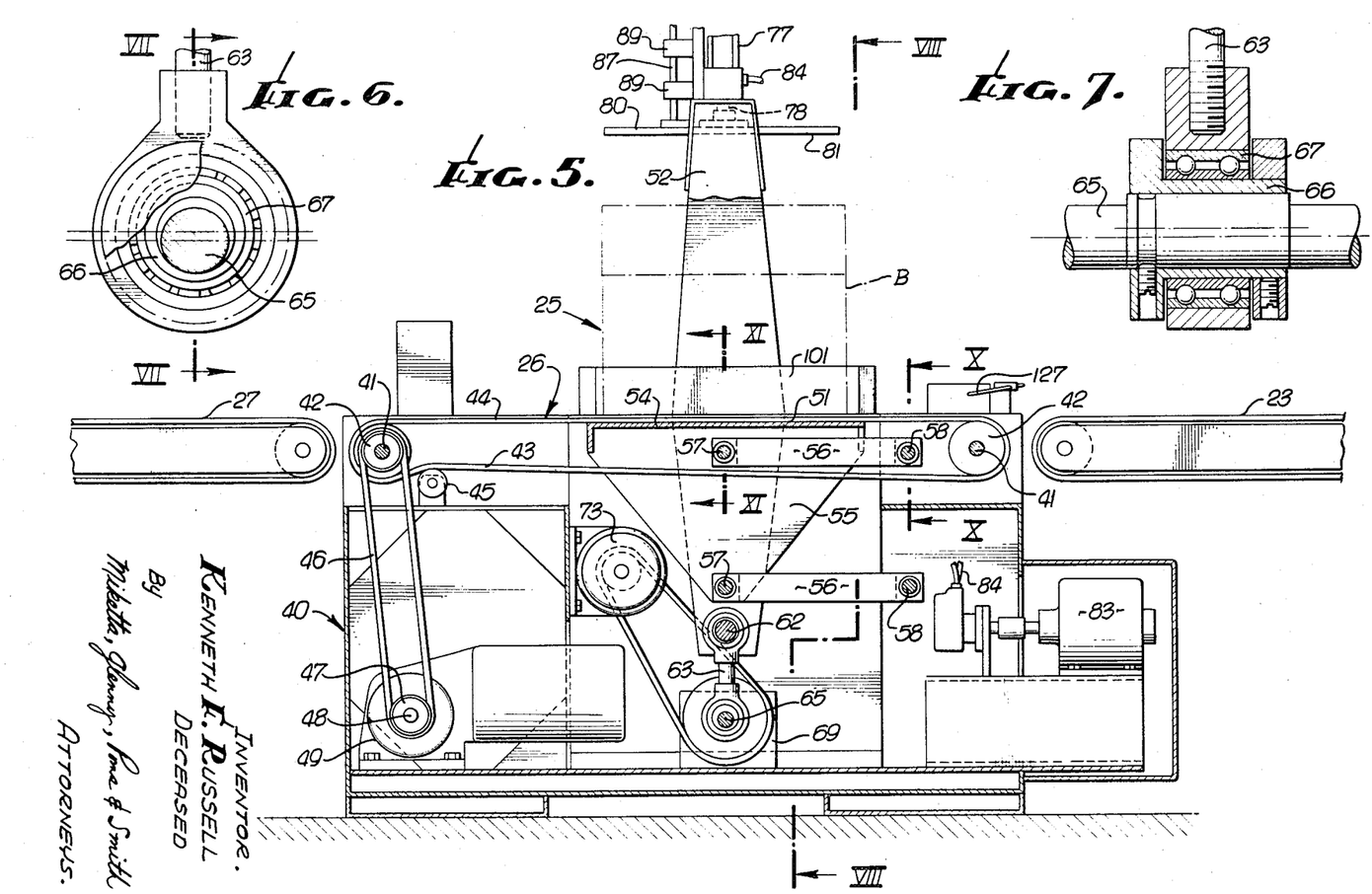
FIG. 5 is an elevational view of FIG. 4, partly in section, the section being taken in the planes indicated by line V—V of FIG. 4.
FIG. 6 is an enlarged view, partly in section, of the eccentric-crank connection shown in FIG. 5.
FIG. 7 is a sectional view taken in the plane indicated by line VII—VII of FIG. 6.
Figure 8:
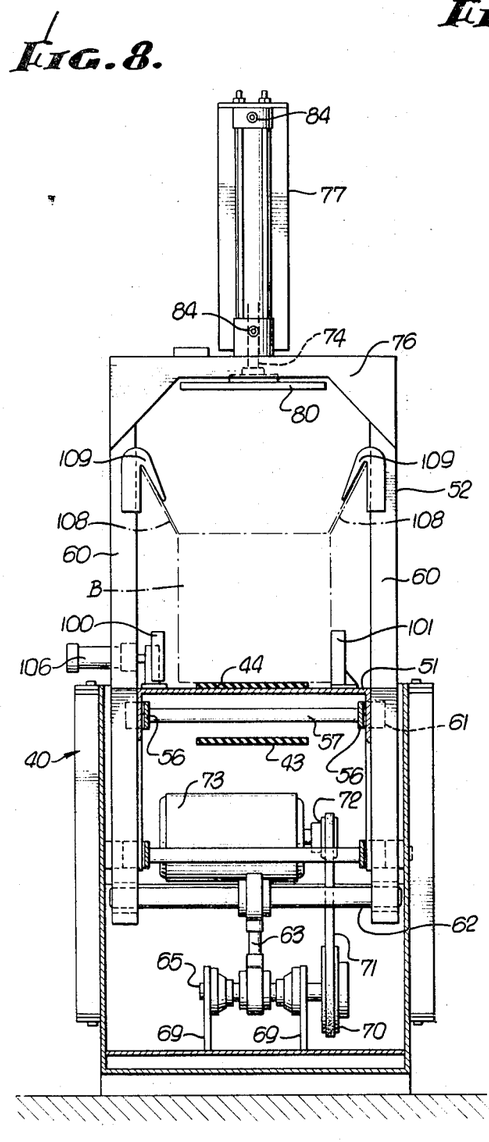
FIG. 8 is a vertical transverse sectional view taken in the planes indicated by line VIII—VIII of FIG. 5.

Means for imparting reciprocal vibratory movement to both the box support table 51 and the upstanding bridge-like frame means 52 may comprise a driven shaft 65 having mounted thereon an eccentric sleeve 66 (FIG. 7) which carries bearings 67 and to which the lower end of crank rod 63 is attached (FIGS. 6 and 7). Shaft 65 is supported by a pair of upstanding spaced mounting plates 69, one end of shaft 65 extending beyond one of plates 69 for driving connection through a pulley 70 to a pulley belt 71 driven from a motor shaft and pulley 72 by a motor means 73 supported in suitable manner from frame means 40.

Side columns 60 may be joined at a selected distance above support table 51 by a top transverse bridge member 76 which may support thereon an upstanding fluid actuated cylinder means 77 having a piston rod 78 extending through an aligned port in bridge member 76 for connection to a flat, planar, rectangular platen 80. Fluid cylinder means 77 may be of double acting type and may be connected with a fluid pressure source 83 by suitable conduit 84 for raising and lowering platen 80.

Platen 80 may have a rectangular or polygonal configuration of slightly less than the area of the top opening of a box B to be positioned therebeneath so that the platen may readily approach the top of box B between the outwardly positioned box flaps. Platen 80 may be made of a suitable material and preferably has a smooth planar finished bottom surface 81 positioned parallel to table plate 54.

Means for controlling the descent and the ascent of platen 80 may be carried externally of fluid cylinder means 77 and may comprise a pair of vertically spaced brackets 86 secured to cylinder means 77 and providing aligned ports for a platen control rod 87 secured as at 88 to the top surface of platen 80. Rod 87 may be guided in spaced slide bearings 89 carried on fluid cylinder means 77. Between brackets 86 a plurality of switch means 90, 91, and 92 are provided for engagement with a switch contact collar 93 carried on rod 87. Operation of the switch means will be described hereafter in connection with the operation of the apparatus.

Means for holding a box on table 51 in selected aligned position with platen 80 may comprise spaced parallel guide shoes 100 and 101 supported from top plate 54 at opposite sides of belt lay 44. Shoe 101 may be fixed to top plate 54 by a suitable bolt and slot assembly 103 so that the fixed shoe 101 may be laterally adjusted for boxes of different selected width.

Movable shoe 100 may be carried by a support bar 104 connected to a transversely extending rod 105 of a fluid actuated cylinder means 106 carried by the adjacent side column member 60. As later described when a box B has been positioned on table 51 the cylinder means 106 is actuated to move shoe 100 toward shoe 101 for firmly holding under pressure box B during its vibration period to prevent movement of box B relative to table 51.

Top side flaps 108 of box B may be guided beneath inclined retainer members 109 carried by column members 60 so that the box flaps will not interfere with the downward movement of platen 80. The end flaps of box B normally do not interfere with the downward movement of platen 80 because of prior folding arrangement of the flaps.

Operation of the vibratory apparatus 25 will be described in detail with particular reference to FIGS. 9, 12 and 13. It will be understood from general description of FIG. 1 that an empty box B has been filled by filling apparatus 24 so as to contain a selected precise number of articles which may include a substantially well determined pattern or arrangement on the bottom layer of articles and of which the upper layers of articles are somewhat disarranged with respect to pattern and are relatively loosely packed. When such a container reaches the end of intermediate conveyor 23 and conveyor belt 44 of conveyor 26 is stopped, it will be apparent that forward movement of the box will also be stopped at the junction of conveyors 23 and 26. When conveyor 26 is activated by closing normally open start push button switch 120, the box is rapidly advanced to the vibrating station at which point the conveyor 26 is deenergized and the belt lay 44 stops. The space between the junction of conveyors 23 and 26 and the vibrating station is such that when the front end of a succeeding box reaches the conveyor junction, conveyor 26 will be in stopped condition. The speed of conveyor 26 is more rapid than the speed of conveyor 23 so that sufficient spacing between boxes occurs before a succeeding box engages conveyor 26.

Push button switch 120 also energizes the pressure fluid system by closure of the normally open starter magneto contacts 121 so that fluid pump motor 122 (FIG. 12) is energized and the fluid pump 83 pumps a suitable liquid such as oil, under pressure through the fluid system. A normally closed push button stop switch 123 is connected with fluid motor relay 124 and an overload 125 so that if desired opening of the push button switch 123 will deactive the fluid pressure system.

Conveyor 26 advances a box from the conveyor junction 23, 26 to the vibrating station and stops the conveyor so that the box is positioned at the vibrating station as hereafter described. When contacts of start switch 120 are closed, a circuit is provided through normally closed relay contacts 148c and normally closed relay contacts 130b to a conveyor motor relay 131 to cause the conveyor 26 to advance the box to the vibrating station.

As the box is advanced by conveyor 26 a side of the box contacts limit switch member 127 which has normally open contacts 127a and normally closed contacts 127b. Closing of normally open contact 127a energizes relay 128 and closes relay contacts 128a so that relay 128 may act as a holding relay. Closing of contacts 128a also energizes relay 130 which closes normally open contacts 130a which holds the relay 130 energized and which also provides a circuit to pressure switch 137, the vibratory motor relay 132 and the box holding fluid cylinder relay 134. Normally open contact 132 serves as a manual test switch for the several operations mentioned above.

When the box clears switch 127, the contacts 127a return to open position, relay 128 being held by the closed contacts 128a. The contact 127b is returned to its normally closed position and the relay 130 is held in energized condition by the closure of the relay contact 130a. Thus the limit switch 127 and the circuits associated therewith are partially conditioned for commencing the second cycle.

Closure of relay contact 130a causes energization of the vibratory motor 73 through the relay 132 and associated overload 133 so that as the box is stopped by the conveyor 26 the vibratory apparatus is actuated for imparting vibrations to the box and to the vibratory table.

Also when the relay contact 130a is closed, the box holding cylinder 106 is energized and the shoe 104 moves against the box to hold the box in place on the vibratory table. At the same time a time delay 135 is energized which closes a normally open contact 135a to energize the relay 148 and which closes the normally open contact 148a for holding relay 148 in energized condition.

Also when the relay contact 130a is closed, a pressure switch 137 with normally closed contacts 140 causes energization of the relay 139 for actuation of the four-way solenoid valve 139. Solenoid valve 139 (FIG. 12) controls the pressure fluid system and the raising and lowering of platen 80. The normally closed contacts 140 are provided on the lower most limit switch 92 (FIG. 9). Limit switch 92 is vertically adjustable on the frame means between the brackets 86 and thus may determine positively the limit of downward travel of platen 80. When the limit switch 92 is actuated so that the normally closed contacts 140 are opened, such opening of the contacts 140 at 140a may completely overrule the time delay 135 so that the platen may be reversed in its stroke before the time delay takes effect.

Since the four-way solenoid valve relay 139 has commenced downward movement of the platen by actuation of the solenoid valve 139 and the supply of differential fluid pressure to the cylinder 77 so that the platen 80 moves downwardly, as the platen moves downwardly the collar 93 on the rod 87 will contact the limit switch means 90 having normally open contacts 142 and to close said contacts to energize the relay 145 which actuates the solenoid valve 145a to restrict the flow of pressure fluid beneath the piston in the cylinder means 77 and to thereby reduce the speed of descent of platen 80. The length of the descent at the selected intermediate speed depends upon the location of the limit switch means 90 and the limit switch means 91.

When limit switch means 91 is contacted by collar 93 the normally open contacts 91a are closed to energize the relay 143 for the solenoid valve means 143a to further restrict the flow of fluids to the lower portion of the cylinder means 77 and to further reduce the speed of descent of platen 80. The switch means 91 is vertically adjusted so that the platen 80 moves very slowly to its lowest position above the box.

Figure 9:
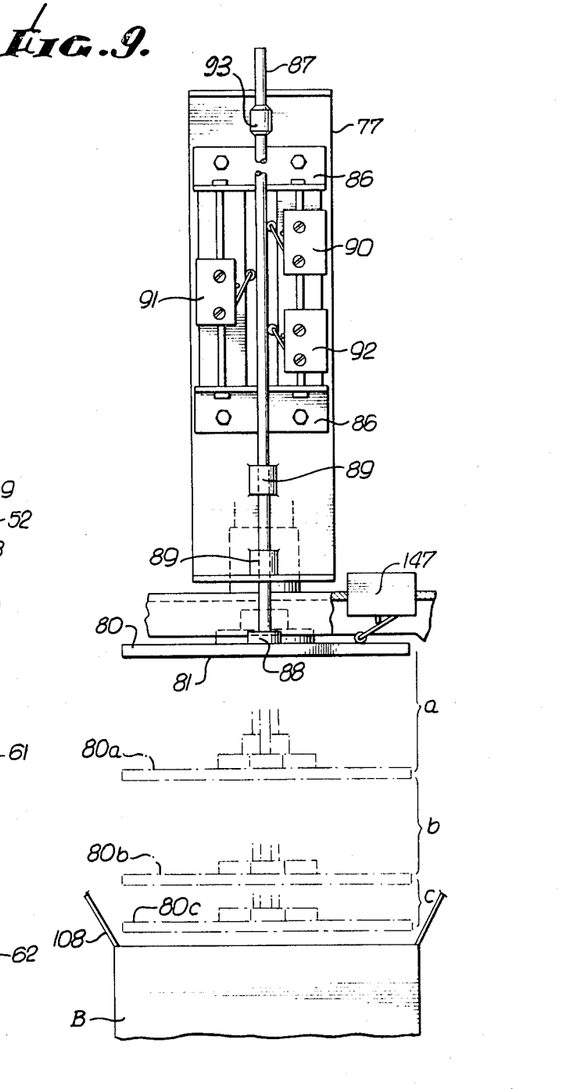
FIG. 9 is a front elevational view taken in the plane indicated by line IX—IX of FIG. 4 and partly schematic to illustrate action of a platen.

This action is further indicated in FIG. 9 where the downward movement of platen 80 at its initial stage is indicated by the distance a. As the platen descends and collar 93 contacts the arm of switch means 90, the speed of descent of the platen is further reduced while traveling the distance indicated by bracket b to an intermediate position 80b.

As the platen continues to descend, it will be further limited in its speed of descent until it approaches the position indicated at 80c immediately above the fruit.

When the collar 93 contacts switch means 92 and closes normally open contacts 140a, the relay 148 opens normally closed contacts 148c to deenergize the solenoid valve means 143a and 145a and to prepare the hydraulic system for reversal of fluid flow. The relay 148 also closes normally open contacts 148b to energize time delay 150 which serves to hold the platen momentarily at its lowermost position until the vibratory motion has ceased. Energization of the time delay 150 closes normally open contacts 150a which energizes the four-way solenoid valve 139 so as to reverse the flow of fluid therein and to cause the platen 80 to move upwardly. Relay 148 controls relay 130 and upon energization of relay 148 the normally closed contacts 148c are opened and the circuits to the motor vibrator, motor conveyor, solenoid valves 143a and 145a, and limit switch 127 are opened so that the vibratory apparatus is deenergized and the relay 130 is also deenergized. When the platen 80 reaches its uppermost position, it contacts normally closed switch means 147 and opens switch 147 to deenergize relay 148 and to close the previously opened and normally closed contacts 148c.

Closing of contacts 148c causes the conveyor motor relay 131 to be energized for driving the conveyor 26 for moving the filled and vibrated box from the vibrating station to the distribution conveyor. As soon as the belt conveyor 26 commences to move, the succeeding box which has been held stationary by nonmovement of the belt conveyor 26 during the vibrator cycle commences to advance onto the conveyor 26 to commence the second cycle.

When an open box containing fruit or articles has been positioned on the vibrating platform and the switch means actuated as above-described, the platform is caused to vibrate with an essentially vertical motion by eccentric 65 and crank 63 which vibrates not only table 51 but also the bridge means 52 and platen 80. The parallelogram arms 56 permit such vibration without imparting a horizontal force component of any significance. Since the bridge means 52 and the vibrating table 51 are connected and move simultaneously together, it will be apparent that as the table, box and platen 80 vibrate with the same frequency, amplitude, and in phase, platen 80 may move downwardly toward and relative to the box. Thus the table, the box and the platen move together in phase and amplitude, and during the vibratory cycle there is no relative approach or retraction of the platen 80 with respect to the amplitude of vibratory frequency.

This is important to note because as the fruit are imparted vibratory forces from the table, the fruit tends to move vertically for a short distance as a result of such vibratory pulsations. In such agitated movement the fruit has a tendency to rearrange its pattern and to settle and close voids between fruit in the box. While the fruit are thus presenting an agitated, changing top surface to the platen, the platen moves more closely to the fruit but not in direct opposition to vibratory motion components because of its direct association with the vibrating table. The platen moves downwardly to a point approximately a quarter of an inch above the top of the fruit in the last stages of the vibratory cycle and while fruit of the upper layer may contact the platen surface no pressure is applied to the fruit in the sense of attempting to squash or push downwardly on the fruit. Instead it is desirable that the fruit may move and in a sense float in the box as a result of the vibrations so that each fruit will seek out a void and fill that void compactly and snugly. In the very last final phase of the downstroke of the platen, a slight final holding pressure may be applied to the top of the fruit and retained until the vibratory motion ceases, at which time the platen moves upwardly.

Box B is preferably of a type which may comprise an outer sleeve-like portion which permits vertical adjustment so that the end flaps thereof may be properly closed over the fruit. Thus, during vibration and downward confining movement of the fruit by the platen, the outer sleeve portion of the box may appear to slightly rise from a ¼" to ½" because of the movement and action of the fruit within the box.

The length of the vibratory cycle may be modified depending upon the size of the fruit being packaged so that a sufficient vibratory period is provided for permitting the fruit to shift and move into a simulated hand-packed arrangement. In some instances, such a time cycle may be approximately 10 seconds.

Figure 12:
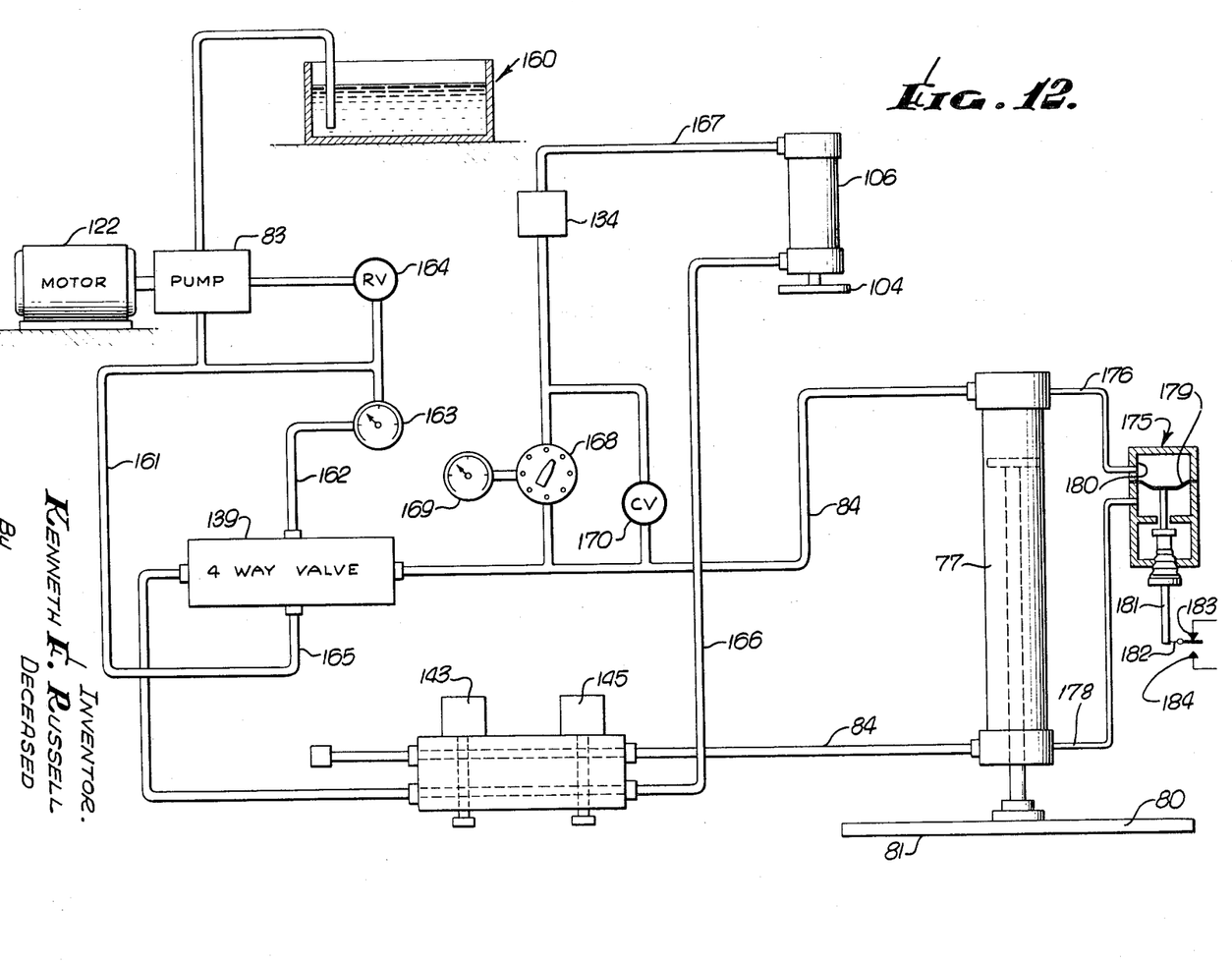
FIG. 12 is a schematic view of the fluid control system employed with the apparatus shown in FIG. 4.
Figure 13:
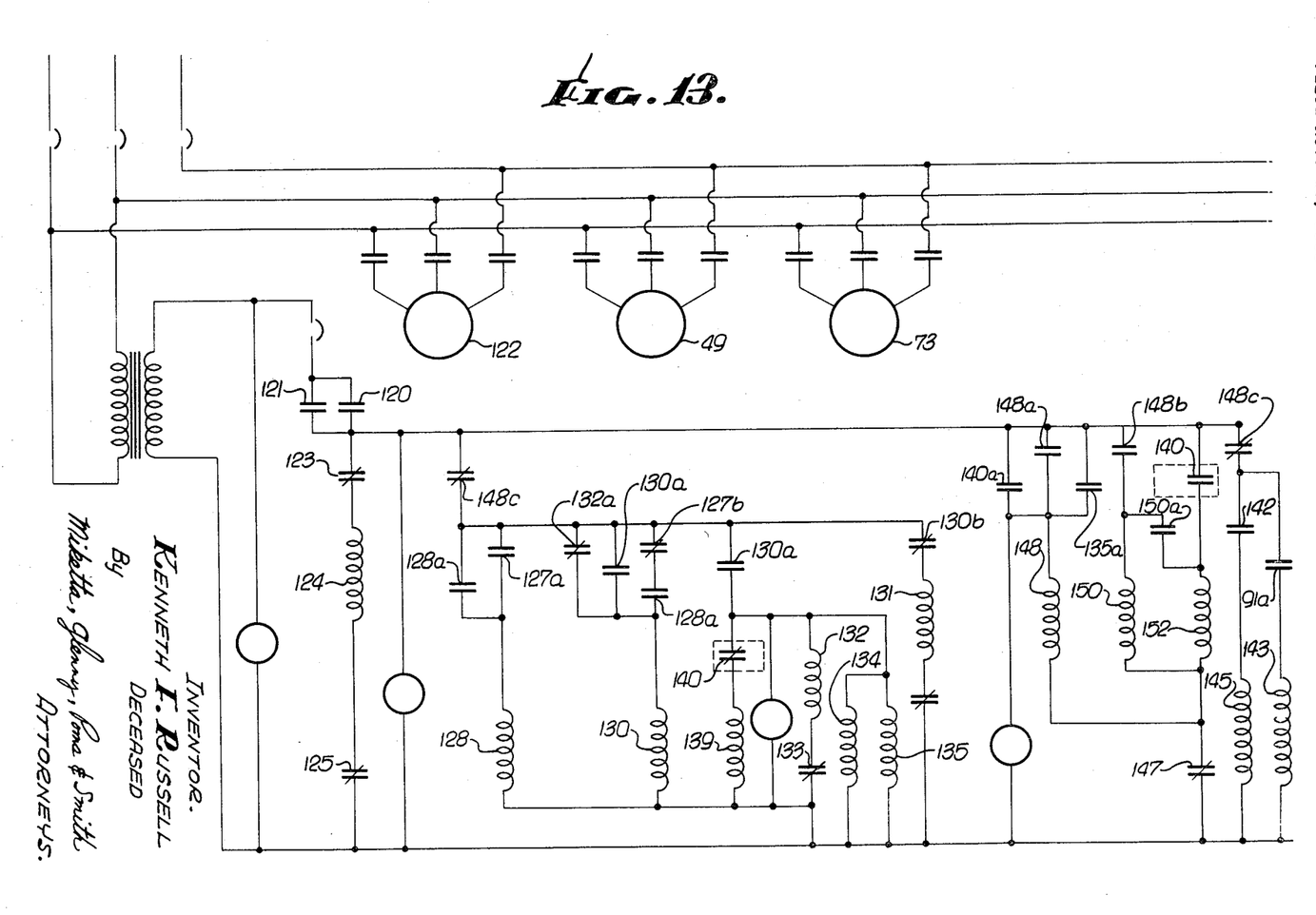
FIG. 13 is a schematic wiring diagram for the apparatus shown in FIG. 4.

In further description of FIG. 12 which schematically shows the hydraulic fluid actuating system of platen 80 and shoe 104 which holds a box on the vibrating platform it may be generally noted that motor 122 drives a suitable known fluid pump 83 which may be supplied with pressure fluid from a suitable source generally indicated at 160. The pump 83 is connected to the four-way solenoid valve 139 by a fluid flow line 161 and a return line 162 provided with a suitable gauge 163 and a suitable relief valve 164. Fluid entering four-way solenoid valve at 165 may be directed by said valve to solenoid operated valves 143 and 145 for controlling the rate of descent of platen 80 and may also be connected by fluid line 166 to the fluid cylinder 106 for actuation of the holding shoe 104. The cylinder 106 is connected at its top to a fluid line 167 which leads to box holding solenoid valve 134 which may be in communication with four-way valve 139 and with the upper end of the cylinder means 77 through a pressure regulator 168 provided with a suitable gauge 169 and a bypass check valve 170 in communication with line 84 between the pressure regulator and the cylinder 77. It will thus be apparent that the fluid pressure system actuating the cylinder 77 and that actuating the box holding cylinder 106 may be operated at a selected pressure and that relief of pressure on the upper side of cylinder 77 may be accomplished without loss of fluid pressure on box holding cylinder 106. The rapidity by which platen 80 descends or is raised depends on the fluid pressure differential in cylinder 77 and such pressure differential is regulated by the solenoid valves 143 and 145 so that the platen 80 moves slowly as it approaches the top of the fruit in a box.

It may be desirable to provide a pressure limiting device on the vibrating apparatus to prevent the platen from moving against the top surfaces of fruit and imposing a high pressure thereon such that damage or crushing of the fruit might occur. For example, under production packaging conditions a stray fruit may be above the top of the box and may not have found its proper void or opening among the rest of the fruit during the vibration periods in the filling apparatus 24 or during the transport of the box along the conveyors where some vibration and juggling of the fruit in the box occurs. In such an event when the bottom surface of platen 80 contacts such an exposed stray fruit and begins to continue to exert a downward pressure against the fruit a preselected pressure differential may be sensed by a differential pressure switch 175 shown in FIG. 12 with cylinder means 77.

Pressure differential switch 175 may be connected to fluid lines 176 and 178 having communication with the top and bottom respectively of cylinder means 77. Lines 176 and 178 lead to opposite sides of a fluid tight diaphragm 179 in a switch chamber 180. A diaphragm actuated rod 181 may be biased against diaphragm 179 and responds to variations in displacement of diaphragm 179 caused by pressure differential on opposite sides of the diaphragm. Thus when the rod 181 is properly adjusted with respect to a switch member 182, normally closed contact 183 may be connected in the schematic circuit diagram between the limit switch means 141 and the solenoid valve means 143. Thus in the event the pressure differential occurring on opposite sides of the piston in the cylinder means 77 exceeds a selected amount on the upper side of the piston which would represent a pressure against the platen 80 by a fruit, rod 181 would be driven downwardly by such fluid pressure to open contacts 183 and close contacts 184 on the pressure switch to reverse the four-way solenoid valve 139 to thus raise the platen until the differential pressure switch 175 returns to its original position at which the four-way solenoid valve may again be reversed to resume down travel of the platen. Such temporary raising of the platen often allows the fruit to shift or move into a better and more tight pattern or arrangement within the box.

The vibrating apparatus described above thus imparts substantially vertical vibrations to articles such as fruit in a box which is held on a vibrating table for settling and arranging the fruit and from which fruit is contained during vertical movement of the fruit by a downwardly descending platen that is also vibrating in the same amplitude, frequency and phase as the box which contains the fruit. This in-phase vibration of the platen, box, vibrating table while containing the fruit in the box yet permitting movements of the fruit without imparting a directly opposite destructive impact force against the fruit is an important feature of the present invention. As a result of this feature not only are the fruit arranged in a tight relatively uniform pack but they are also kept from damage and bruising. Each packed box may be turned upside down after closing the open flaps so that the bottom layer will normally appear on the top of the box when the box is opened for display for inspection purposes or for sale at a retail store.

It should be noted that the platen surface is smooth and finished and that its area and shape is just slightly less than the open area of the box. When the platen surface moves into proximity with the top layer of fruit as the fruit is vibrating, it not only contains the fruit within the box but also appears to produce a secondary effect on the fruit which causes the fruit to move and flow laterally so as to fill the voids between fruit in the box as much as possible. In the final stages of the vibratory cycle and when the mass of discrete fruit have become partially stabilized dimensionally, the platen surface may contact the top layer of fruit or a momentary interval and with slight pressure so that the arrangement of the fruit is finally stabilized. The platen is held in this position until the vibratory cycle stops as heretofor described.

It will be understood that various modifications and changes may be made in the vibratory apparatus described above and all such changes and modifications coming within the scope of the appended claims are embraced thereby.

I claim
1. In a vibrating means to facilitate packing of discrete articles such as fruit and the like, the combination of:
   a support means for a receptacle containing discrete articles to be packed;
   an opposed platen in parallel vertical spaced relationship to the support means for accommodating a receptacle therebetween;
   means for simultaneously vibrating the support means and platen with the same frequency, same amplitude and in phase; and
   means for moving said platen toward the support means independently of and while maintaining said vertical vibrations therewith for limiting upward movement of the articles due to said vibrations.

2. A vibrating means as stated in claim 1 including means for varying the rate of movement of the platen toward the support means.

3. A vibrating means as stated in claim 1 including stops means for limiting movement of the platen toward the support means.

4. A vibrating means as stated in claim 1 including conveyor means movable over said support means for positioning a receptacle thereover for vibration thereof;
   and means adjacent said conveyor means adapted to be contacted by a receptacle for stopping said conveyor means and starting said vibrating means.

5. A vibrating means as stated in claim 1 including fluid cylinder means for moving said platen:
   said platen being provided with a vertically extending timing rod having engagable means;
   and switch means contacted by said engagable means for regulating the rate of movement of said platen toward said support means.

6. A vibrating means as stated in claim 1 including means on said support means for holding a receptacle during vibration thereof.

7. In a vibratory apparatus for packing of discrete articles such as fruit and the like, the combination of:
   means defining a path for a receptacle;
   a vibratable frame means of generally open rectangular form through which said path extends and comprising
   upstanding side members on opposite sides of and extending above and below said path;
   a top transverse member interconnecting top ends of said side members;
   a support table disposed below said path and supported by a pair of side plates extending parallel to said side members;
   means supporting said frame means for vertical movement including a pair of parallelogram arms pivotally connected to said side members and to said frame;
   a shaft extending transversely between and connecting the lower ends of said side members;
   means for vibrating said vibratory frame means including eccentric means connected to said shaft;
   a platen positioned between upper ends of said side members in vertical spaced relation to said supporting table;
   fluid actuating means carried by said top transverse member for lowering and raising said platen;
   and means carried by said platen and said top transverse member for controlling descent of said platen.

8. A vibrating means as stated in claim 7 including receptacle grasping means carried by said side members at said path.

9. A vibratory apparatus as stated in claim 7 including means for transporting a receptacle along said path.

10. In a method of packing a receptacle with articles of selected size and shape and in which the receptacle contains a preselected number of articles in a loosely packed condition provided by at least partially vibrating said receptacle during feeding of articles thereto, comprising the steps of:

positioning said loosely packed receptacle at a vibratory station;

subjecting the receptacle and the loosely packed articles therein to vertical vibrations imparted thereto by a vibratory support table and with a superposed platen at said station;

vibrating said platen at the same frequency and amplitude and in phase as said support table;

moving said platen downwardly independently of and while maintaining said vertical vibrations for limiting upward movement of articles due to said vibrations;

and moving said platen away from said receptacle after a predetermined descent of said platen and vibration time period.

11. A method as stated in claim 10 including the step of:

sensing pressure between said platen and upwardly vibrating articles and raising said platen when said pressure exceeds a preselected amount to prevent damage to said articles.

12. A method as stated in claim 10 including the step of:

varying the rate of downward movement of said platen.

13. In a vibrating apparatus for the packing of discrete articles of fruit or the like in a receptacle and including a receptacle supporting member adapted to be imparted vibratory forces, and means for vibrating said supporting member associated therewith, the improvement comprising:

a platen member;

means on the receptacle supporting member for mounting the platen member in spaced relationship to said receptacle for corresponding vibratory movement with said receptacle and receptacle supporting member during a vibratory cycle; and means for moving one of said members toward the other member for limiting movement of articles in the receptacle during at least a portion of said vibratory cycle.

14. The improvement as in claim 13 additionally comprising:

holding means for holding the receptacle on the support member between the moving platen member and the support member during vibration and the approach of the platen member.

15. The improvement as in claim 13 wherein the moving means includes:

fluid cylinder means for moving said platen member toward said support member and switch means for controlling the rate of approach of the platen member to the support member, said switch means providing an initial fast approach and a slow approach as the platen member nears the receptacle.

16. The improvement as in claim 13 wherein the mounting means includes:

side members with one of their ends secured to the support member, and other of their ends located opposite each other;

a transverse member secured between said other ends of the side members a selected distance from the support member to permit the receptacle and platen member to pass therebetween; and means for movably mounting the platen member to the transverse member for movement relative thereto toward the support member.

References Cited

UNITED STATES PATENTS

| | | | |
|---|---|---|---|
| 3,492,779 | 2/1970 | Russell | 53—59 |
| 3,509,687 | 5/1970 | Fleissner | 53—126X |
| 1,583,875 | 5/1926 | Grono | 53—126 |
| 2,429,071 | 10/1947 | Pirie | 53—126 |
| 2,713,446 | 7/1955 | Vaughan | 53—126X |
| 2,849,845 | 9/1958 | Prickett | 53—126X |
| 2,983,088 | 5/1961 | Stoeckel | 53—126X |
| 3,099,115 | 7/1963 | McKibben | 53—126X |
| 3,344,579 | 10/1967 | Gentry | 53—126 |
| 3,417,543 | 12/1968 | Jones | 53—126 |

WAYNE A. MORSE, JR., Primary Examiner

U.S. Cl. X.R.

53—126